US005882209A

United States Patent [19]

Gabig et al.

[11] Patent Number: 5,882,209

[45] Date of Patent: Mar. 16, 1999

[54] MERCHANDISING SELLING SYSTEM AND DISPLAY UNIT

[75] Inventors: Joseph A. Gabig, Library; David B. Jones, Pittsburgh, both of Pa.

[73] Assignee: Matthews International Corporation, Pittsburgh, Pa.

[21] Appl. No.: 19,510

[22] Filed: Feb. 5, 1998

Related U.S. Application Data

[63] Continuation of Ser. No. 784,972, Jan. 16, 1997, Pat. No. 5,759,045.

[60] Provisional application No. 60/010,121 Jan. 17, 1996.

[51] Int. Cl.$^{6}$ .................................................... G09B 25/00

[52] U.S. Cl. ............................................ 434/367; 434/378

[58] Field of Search .................................... 434/367, 378, 434/365, 430, 72, 74, 75, 98, 105; 40/124.5

[56] References Cited

U.S. PATENT DOCUMENTS

| | | | |
|---|---|---|---|
| 1,268,440 | 6/1918 | D'Olier, Jr. | 434/430 X |
| 1,516,264 | 11/1924 | Bliss | 434/378 X |
| 2,074,704 | 3/1937 | Osborne | 356/421 |
| 2,172,172 | 9/1939 | Mount | 434/367 |
| 3,178,243 | 4/1965 | Dirmeyer . | |
| 3,878,633 | 4/1975 | McWilliams . | |
| 3,995,387 | 12/1976 | Lotts . | |
| 3,997,220 | 12/1976 | Mayer . | |
| 4,102,072 | 7/1978 | Buschman . | |
| 4,433,883 | 2/1984 | Boender et al. . | |
| 4,457,718 | 7/1984 | Lerner | 434/367 X |
| 4,591,215 | 5/1986 | Robbins . | |
| 4,736,996 | 4/1988 | Zeichner . | |
| 5,038,506 | 8/1991 | Liljeqvist et al. . | |
| 5,052,616 | 10/1991 | Joyce . | |
| 5,371,962 | 12/1994 | Botos . | |
| 5,443,310 | 8/1995 | DeFelice et al. . | |
| 5,553,724 | 9/1996 | Moher et al. . | |
| 5,687,515 | 11/1997 | Rodrigues et al. | 52/103 |
| 5,759,045 | 6/1998 | Gabig et al. | 434/367 |
| 5,797,755 | 8/1998 | Montgomery | 434/429 |

FOREIGN PATENT DOCUMENTS

| | | |
|---|---|---|
| 6239/27 | 7/1927 | Australia . |
| 34212/68 | 9/1969 | Australia . |
| 0 415 713 A2 | 3/1991 | European Pat. Off. . |
| WO 92/16124 | 10/1992 | WIPO . |
| WO 96/04972 | 2/1996 | WIPO . |

*Primary Examiner*—Jeffrey A. Smith

*Attorney, Agent, or Firm*—Reed Smith Shaw & McClay LLP

[57] ABSTRACT

A product display board for display of a plurality of product lines of memorial products having a plurality of design features. The product display board includes samples of memorial products of each product line arranged in rows with related design features arranged in columns.

20 Claims, 1 Drawing Sheet

MERCHANDISING SELLING SYSTEM AND DISPLAY UNIT

CROSS REFERENCE TO RELATED APPLICATION

This is a continuation of U.S. patent application Ser. No. 08/784,972 filed on Jan. 16, 1997 and now U.S. Pat. No. 5,759,045 which claimed the benefit of earlier filed United States Provisional patent application Ser. No. 60/010,121, filed on Jan. 17, 1996.

BACKGROUND OF THE INVENTION

1. Field of the Invention

The present invention relates to display units, more particularly, to a product display unit for displaying product lines having a plurality of design features.

2. Description of the Prior Art

Memorial products are conventionally displayed and marketed by funeral homes, cemeteries, memorial parks and the like by presenting samples of finished memorial products such as head stones, plaques and other grave markers. Such finished product samples include numerous design features in an attempt by the seller to show many variations in the product. Merchants of memorial products also rely upon product brochures and other literature depicting the features of the memorial products.

Memorial products are available in a range of product lines representing various styles and product qualities. Each finished product for such product line is normally available with several different design features such as borders, lettering font, decorations, religious indicia, personalized designations and the like.

Memorial products usually are purchased by a close relative or friend of a deceased person soon after the deceased's death. Thus, the purchaser of memorial products often is grief stricken and may not possess the energy or ability to focus on the purchasing process for selection of a memorial product. When faced with making a choice for memorial product, the purchaser must view various finished product samples with the design features thereon along with product literature to form a decision. Memorial products tend to be relatively costly in view of the materials used, such as bronze and marble, as well as the customized nature of memorial products.

Thus, the grieving person is faced with making a significant purchase at a time when extensive thought and consideration into the nature of the purchase may not be used. There is no known merchandising and display unit for memorial products which allows a grieving person to view all the possible product lines and design features offered by a memorial product merchant in a timely manner with a minimum of effort. Moreover, the existing scant displays of memorial products and sales brochures therefor require the purchaser to imagine how the finished product will appear.

Considering the anticipated longevity of memorial products, selection of an acceptable product which will tastefully and appropriately memorialize the deceased is critical. Such a decision is typically made by a purchaser hurriedly without the benefit of the careful deliberation normally performed when making a significant purchase.

It is an object of the present invention to provide a merchandising selling system and display unit for memorial products which eases the purchasing process for purchasers of memorial products.

SUMMARY OF THE INVENTION

The present invention includes a product display board for display of product lines, the display board including a planar member and a plurality of horizontally arranged linear arrays mounted on the planar member, each of the arrays displaying one product line and including a plurality of cells, each of the cells including a product sample displaying at least one design feature, whereby a plurality of product lines having a plurality of design features are displayed. Each of the cells displaying one of the design features is linearly arranged, preferably vertically, with another of the cells displaying the one design feature.

The product samples each include a memorial product and each design feature is selected from the group consisting of finishes, borders, decorations, lettering fonts, personalized designations, floral holders and combinations thereof. Each of the design features includes a plurality of design options. A portion of the vertically arranged cells include finished product samples. The product display board also includes a shelf extending from the planar member.

The invention also includes a method of displaying product lines having a plurality of design features, the method including the steps of: (1) arranging a plurality of cells in a plurality of linear arrays, each of the cells including a product sample, each of the arrays including one product line and each of the product samples displaying at least one design feature, such that each of the cells displaying one of the design features is linearly arranged with another of the cells displaying the one design feature and (2) mounting the linear arrays on a planar member. The product samples used in the inventive method may include memorial products.

DESCRIPTION OF THE PREFERRED EMBODIMENT

Figure 1:
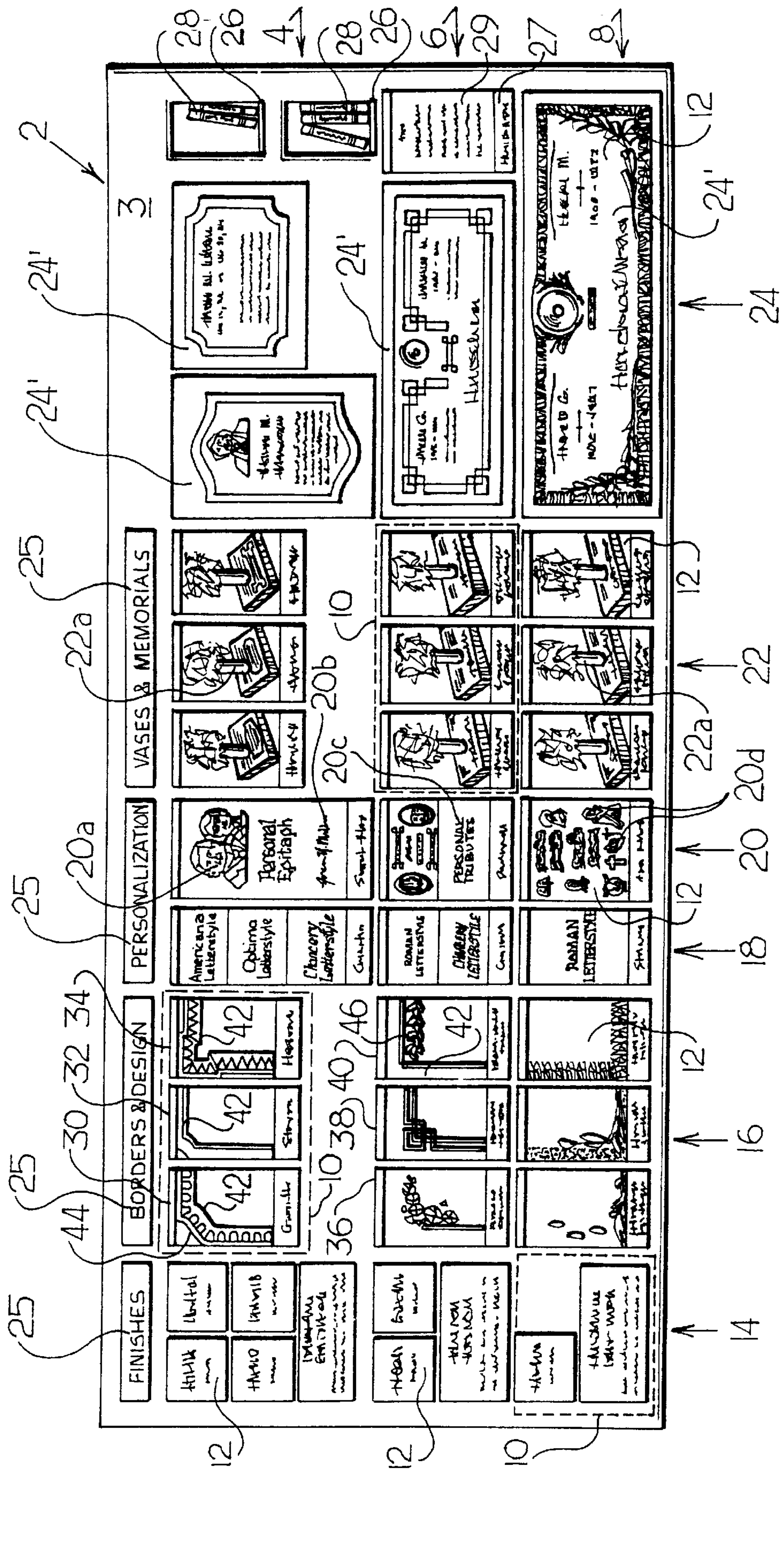
FIG. 1 is a front elevational view of a product display board made in accordance with the present invention.

FIG. 1 illustrates the product display board of the present invention. The product display board 2 includes a plurality of linear arrays or rows 4, 6 and 8 mounted on a planar member 3, such as a wall. Each of the rows 4, 6 and 8 contains a plurality of the cells 10, examples of the cells 10 are shown encircled by dashed lines in FIG. 1. The cells 10 contain one or more samples of product 12.

The samples of product 12 lying in each of rows 4, 6 and 8 represent one product line. Thus, each of rows 4, 6 and 8 represents a different product line displayed on the board 2. The cells 10 of the rows 4, 6 and 8 are also arranged linearly in columns 14, 16, 18, 20, 22 and 24. The cells 10 are positioned at an intersection of each of the rows 4, 6 and 8 with each of the columns 14, 16, 18, 20, 22 and 24. Each of the cells 10 contain product 12 from one product line having at least one design feature displayed.

Each of the columns 14, 16, 18, 20 and 22 display one design feature. Each of the columns 14, 16, 18, 20 and 22 includes a heading 25 which identifies the particular design feature displayed in the samples of product 12 of the columns 14, 16, 18, 20 and 22. By way of example only, the column 14 displays various finishes or colors available for the product 12; the column 16 displays various borders with decorations available for the product 12; the column 18 displays lettering fonts available for the product 12; the column 20 displays personalized decorations such as base relief portraits of the deceased 20*a,* the deceased's signature 20*b,* personal tributes 20*c,* religious symbols 20*d* and the like available for the product 12; and column 22 displays depictions or photographs 22*a* of floral holders or vases for floral arrangements which may be added to the product 12.

Each of the products 12 in the cell 10 of the column 14 and the row 4 displays one color or finish available for the product line displayed in the row 4. Each of the products 12 in the cell 10 of the column 16 and the row 4 displays a border with decoration available for the product line displayed in the row 4. In a similar manner, the cells 10 of the columns 18, 20 and 22 contain products 12 displaying the design features of the respective columns 18, 20 and 22 available for the product line displayed in the row 4. The products 12 displayed in the rows 6 and 8 display each of the design features available for the respective product lines displayed in rows 6 and 8.

The column 24 displays finished product samples 24' for each product line of the rows 4, 6 and 8 which contain several of the design features displayed in the columns 14, 16, 18, 20 and 22.

The cells 10 contain more than one sample of product 12. For example, the samples of product 12 designated as 30, 32 and 34 in the cell 10 in the row 4 and in the column 16 display different decorative borders from the samples of product 12 designated as 36, 38 and 40 of another cell 10 in the row 6 and in the column 16. Each design feature displayed in each of the columns 14, 16, 18, 20 and 22 includes a plurality of design options. For example, the design feature displayed in the column 16 includes borders 42. The borders 42 further include design options such as a rounded corner 44 on the product 30 and a decorative leaf pattern 46 on the product 40. Thus, the column 16 displaying the design feature of the borders 42 for each product line displayed in each of the rows 4, 6 and 8 includes a plurality of design options for each product line. Although each product line includes a set of design features selectable by the purchaser, the particular design feature available for each product line may differ from product line to product line.

Continuing with the example, the product line displayed in the row 4 is of a higher grade or quality than that in the row 6, thus, the borders 42 and decorations (such as shown at 46) displayed on the product 30, 32 and 34 are relatively more distinctive and of a higher grade than the borders and decorations displayed on the products 36, 38 and 40. In this example, the lowest grade product line is displayed in the row 8. The row 6 contains the products 12 of a higher grade than the products 12 in the row 8. The row 4 contains the products 12 of a higher grade than the products 12 in the row 6.

The product display board 2 depicted in FIG. 1 displays rows 4, 6 and 8 of product lines extending horizontally across the planar member 3 and the columns 14, 16, 18, 20, 22 and 24 of design features extending vertically along the planar member 3. However, the subject of the rows 4, 6 and 8 and columns 14, 16, 18, 20, 22 and 24 could be switched such that the design features are displayed in rows and the product lines are displayed in columns.

The product display board 2 includes one or more shelves 26 mounted to and extending from the planar member 3 and supporting a notebook 28 or similar device containing promotional literature and the like. A literature display member 27 supporting sheets 29 of pricing information and the like is mounted to the planar member 3.

The present invention also includes a method of displaying product lines having a plurality of design features. The inventive method includes the steps of arranging a plurality of the cells 10 in a plurality of the rows 4, 6 and 8 and the columns 14, 16, 18, 20, 22 and 24 as described herein above and mounting the cells 10 to the planar member 3.

A prospective purchaser of a memorial product upon viewing the display board 2 can immediately perceive the overall design aesthetics of the offered memorial products and the various design features available for each of the product lines. Upon viewing the complete display board 2, the purchaser can quickly appreciate all of the product lines available as well as the design features available for each of the product lines in addition to the appearance of finished product. The board 2 provides a tasteful means for visually supplying design information to permit the purchaser to make an informed design in a timely manner with a high degree of confidence in the appearance of the finished memorial product. For the typical purchaser of memorial products, the ability to select a memorial product in an efficient manner with a minimum of deliberations is critical. The product display board 2 of the present invention can ease the selection process by displaying all the options for a memorial product in one single unit.

Although the present invention has been described in detail in connection with the discussed embodiment, various modifications may be made by one of ordinary skill in the art without departing from the spirit and scope of the present invention. In particular, the product display board 2 has been described and shown in FIG. 1 as having a planar member 3 with the products 12 mounted to the planar member 3 being of full scale. The present invention is not limited to the use of a planar member and full scale products, but also may be modified to use a curved surface instead of the planar member 3 or be reduced in size using miniaturized versions of the products 12. The product lines and design features may also be displayed in arrangements other than the rows and columns disclosed, such as radial arrangements, without departing from the spirit and scope of the present invention. Therefore, the scope of the present invention should be determined by the attached claims.

I claim:

1. A product display board for display of memorial products, said display board comprising:

a display board member; and at least one array mounted on said display board member, each said at least one array displaying a product line of memorial products and including a plurality of cells, each said cell including a product sample of a memorial product.

2. A product display board as claimed in claim 1, wherein each product sample displays at least one design feature, said at least one design feature comprising at least one design option for a memorial product.

3. A product display board as claimed in claim 2, wherein each said at least one design feature is selected from the group consisting of finishes, borders, border decorations, lettering fonts, personalized designations, floral holders and combinations thereof.

4. A product display board as claimed in claim 3, wherein each said at least one design option comprises a plurality of design options.

5. A product display board as claimed in claim 4, wherein at least one of said product samples comprises a finished product sample.

6. A product display board as claimed in claim 5, further comprising a shelf extending from said display board member.

7. A product display board for display of memorial products, said display board comprising:

a planar member; and at least one array mounted on said planar member, each said at least one array displaying a product line of memorial products and including a plurality of cells, each said cell including a product sample of a memorial product.

8. A product display board as claimed in claim 7, wherein each product sample displays at least one design feature, said at least one design feature comprising at least one design option for a memorial product.

9. A product display board as claimed in claim 8, wherein each said at least one design feature is selected from the group consisting of finishes, borders, border decorations, lettering fonts, personalized designations, floral holders and combinations thereof.

10. A product display board as claimed in claim 9, wherein each said at least one design option comprises a plurality of design options.

11. A product display board as claimed in claim 10, wherein at least one of said product samples comprises a finished product sample.

12. A product display board as claimed in claim 11, further comprising a shelf extending from said planar member.

13. A product display board for display of product lines of memorial products, said display board comprising:

a display board member; and a plurality of arrays mounted on said display board member, each said array displaying one product line of memorial products and including a plurality of cells, each said cell including a product sample of a memorial product, whereby a plurality of product lines are displayed.

14. A product display board as claimed in claim 13, wherein each product sample displays at least one design feature, said at least one design feature comprising at least one design option for a memorial product.

15. A product display board as claimed in claim 14, wherein said arrays are linear and horizontally arranged.

16. A product display board as claimed in claim 15, wherein each said at least one design feature is selected from the group consisting of finishes, borders, border decorations, lettering fonts, personalized designations, floral holders and combinations thereof.

17. A product display board as claimed in claim 16, wherein each said at least one design option comprises a plurality of design options.

18. A product display board as claimed in claim 17, wherein at least one of said product samples comprises a finished product sample.

19. A product display board as claimed in claim 18, further comprising a shelf extending from said display board member.

20. A product display board as claimed in claim 19, wherein at least one of said arrays displays a product line having a different grade than another of said product lines.

* * * * *